Patented Mar. 14, 1961

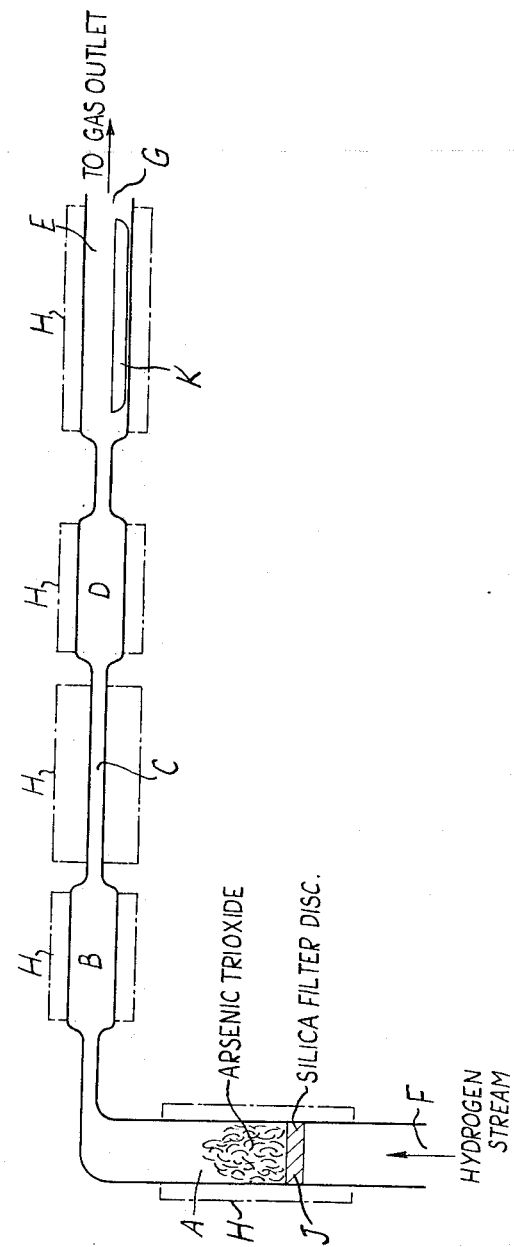

2,975,048

PURIFICATION OF SEMI-CONDUCTOR MATERIAL

George Richard Antell, Sale, and Tudor Wyndham Roberts, Rhymney, England, assignors to Metropolitan-Vickers Electrical Company Limited, London, England, a British company Filed Nov. 25, 1958, Ser. No. 776,310

Claims priority, application Great Britain Nov. 27, 1957

2 Claims. (Cl. 75—84)

This invention relates to the purification of a volatilisable metal, such as arsenic, to an extent such as tor ender it capable of being alloyed with another metal to form a semi-conducting material. The invention is also concerned with the production of the semi-conducting material from the purified metal by an alloying process involving volatilisation.

Alloys of arsenic with aluminium, gallium or indium are known to possess semi-conductivity when the alloy is in the stoichiometric proportion corresponding with the formulae AlAs, GaAs, or InAs respectively, or a close approximation thereto. The presence of uncontrolled impurities in the alloy causes large variations in the electrical properties of the alloy. One impurity which is often associated with arsenic, and which produces effects of an undesired nature, is sulphur. An other impurity is oxygen.

It is the object of the invention to provide a purification process particularly applicable to the removal of sulphur and oxygen from arsenic, but applicable to any volatilisable metal, which achieves the desired state of purity with greater simplicity than heretofore.

According to the invention a component element of a semi-conducting material capable of being volatilised and containing vaporisable impurity is subjected to a purification process which includes the steps of subjecting the element to oxidation in order to convert it wholly into the oxide, removing the gaseous oxide of the vaporisable impurity simultaneously produced, and reducing to elementary form the now purer oxide of the desired element. The reduction process may be effected by entraining the oxide, whilst being heated, in a stream of reducing gas and carrying it into a heated reaction chamber where reduction takes place, the entraining gas being subsequently led through a condensing chamber in which the reduced element is deposited.

If a desired alloying element is present in the condensing chamber, a controlled introduction of the alloying element into the condensed element may be caused to take place so that semi-conducting material is directly obtained.

The reduction process is preferably carried out in a succession of interconnected heated chambers, the direction of flow of reducing gas being intermittently reversed so that the entrained, partially reduced element (arsenic) can be subjected to repetitive or prolonged action of the reducing gas in order that the undesired impurities are removed.

The process, as applied to the purification of arsenic, will now be described with reference to the accompanying drawing which represents diagrammatically one form of apparatus for carrying out the invention.

It has been demonstrated that even spectrographically pure arsenic metal contains traces of sulphur as an impurity and also oxygen in the form of traces of oxide due to reaction with air. Owing to its position in the periodic table sulphur acts as a donor impurity in the group III–group V compound semi-conductors which contain arsenic. To reduce the sulphur impurity the arsenic is converted to the oxide ($As_2O_3$) thereby reducing the sulphur content, the sulphur being converted to sulphur dioxide and removed during the oxidation process. The arsenic trioxide thus formed is then reduced back to the metal in the apparatus illustrated in the accompanying diagram.

The apparatus consists of a succession of interconnected chambers, or sections A to E through which reducing gas, e.g. hydrogen, is passed from an inlet F to an outlet G, the chambers being provided with suitable heating means indicated by the interrupted lines H.

The arsenic trioxide is introduced into the chamber A which is maintained at a temperature a few degrees below its melting point. A slow stream of very pure hydrogen is passed up through a silica filter disc and then through the arsenic trioxide. At 250° C. the arsenic oxide has a low vapour pressure and so the hydrogen entrains the oxide and carries it through chamber B which is maintained at about 250° C. and into a reaction chamber C which is held at about 800° C. The arsenic trioxide reacts with the hydrogen in reaction chamber C and is partly reduced to the metal. Also in the reaction chamber C any remaining sulphur is converted to hydrogen sulphide and is entrained in and carried away with the gas stream. The mixture of arsenic and arsenic oxide vapours is carried into a condensing chamber D which is maintained at about 80–100° C. and the vapours condense, any water vapour formed by the reduction being swept out of the apparatus. When all the arsenic trioxide has been removed from chamber A, the direction of flow of hydrogen is reversed and chamber D is gradually heated and distills its contents through the chamber C where further reduction takes place, the vapours condensing in chamber B. The flow of hydrogen is again reversed, chamber B heated and chamber D cooled to about 80–100° C.

After three passes through the hot chamber C the arsenic trioxide is substantially completely reduced. Two further passes may then be given and the arsenic is swept into the collecting tube by heating chamber D with the gas stream going from left to right in the diagram. Chamber E, which acts as a collecting tube then contains pure arsenic and hydrogen. This chamber is then evacuated, sealed off, and removed.

If it be desired to introduce a desired alloying element into the arsenic, e.g. to produce a semi-conducting AsIn alloy of stoichiometric proportion, the amount of arsenic trioxide introduced into chamber A is of predetermined quantity. After purification of the arsenic trioxide has been carried out, as above described, the reduced arsenic being finally located in chamber D, a silica boat K containing an appropriate amount of pure indium is placed in chamber E and then the arsenic swept in from chamber D by the gas stream flowing from left to right, following which the tube is sealed. The two elements are compounded by passing a heated zone repeatedly along the boat in both directions. When the reaction is complete the hot zone is passed several times in one direction only. This serves to sweep any unchanged indium to one end of the boat in accordance with the well-known zone refining technique.

The amounts of arsenic trioxide and indium employed must be carefully related to one another in order to obtain the required amounts of indium and arsenic.

What we claim is:

1. A process of preparing from arsenic containing a vaporisable impurity, arsenic in a state of purification suitable to enable it to serve as a component element of a semi-conductor alloy with a metal selected from the group consisting of gallium, indium, and aluminum, which process consists in the steps of oxidizing said arsenic and said impurity, heating said oxide of arsenic and entraining said oxides while heated in a stream of hydrogen, carrying said stream of hydrogen entraining said oxides into a reaction chamber heated to a temperature such that solely by reaction of said hydrogen with said oxides reduction of arsenic takes place with separation of said vaporisable impurity therefrom, leading said stream into a condensing chamber in the interior of which said arsenic freed from said impurity is deposited without contact with atmospheric conditions, and causing said stream to flow from said condensing chamber with said impurity entrained therein.

2. In the process as claimed in claim 1, reversing the direction of flow of said stream, heating said condensing chamber to cause distillation of said arsenic and its entrainment into said reaction chamber, condensing said distilled arsenic, and then re-distilling the condensed arsenic with a further reversal of said stream in order again to condense arsenic in the condensing chamber.

References Cited in the file of this patent
UNITED STATES PATENTS

| | | |
|---|---|---|
| 1,433,533 | Cullen | Oct. 31, 1922 |
| 2,830,239 | Jenny | Apr. 8, 1958 |
| 2,858,275 | Folberth | Oct. 28, 1958 |
| 2,862,787 | Seguin et al. | Dec. 21, 1958 |

OTHER REFERENCES

Mellor: "Comprehensive Treatise on Inorganic and Theoretical Chemistry," vol. IX, pp. 13 and 14. (Copy in Div. 59.)